(12) United States Patent
Rao et al.

(10) Patent No.: US 12,499,904 B1
(45) Date of Patent: Dec. 16, 2025

(54) MACHINE LEARNING MODEL THAT ESTIMATES HUMAN AUDIO QUALITY ASSESSMENTS

(71) Applicant: Amazon Technologies, Inc., Seattle, WA (US)

(72) Inventors: Sid Shankara Rao, Seattle, WA (US); Michael Mark Goodwin, Scotts Valley, CA (US); Arvindh Krishnaswamy, Palo Alto, CA (US); Michael Klingbeil, North Haven, CT (US); Karim Helwani, Mountain View, CA (US); Erfan Soltanmohammadi, Silver Spring, MD (US)

(73) Assignee: Amazon Technologies, Inc., Seattle, WA (US)

(*) Notice: Subject to any disclaimer, the term of this patent is extended or adjusted under 35 U.S.C. 154(b) by 931 days.

(21) Appl. No.: 17/710,164

(22) Filed: Mar. 31, 2022

(51) Int. Cl.
*G10L 25/60* (2013.01)
*G06N 3/045* (2023.01)
(Continued)

(52) U.S. Cl.
CPC .............. *G10L 25/60* (2013.01); *G06N 3/045* (2023.01); *G06N 3/08* (2013.01); *G10L 25/30* (2013.01)

(58) Field of Classification Search
CPC ..................................................... G10L 25/60
(Continued)

(56) References Cited

U.S. PATENT DOCUMENTS

| | | | |
|---|---|---|---|
| 2018/0197532 A1* | 7/2018 | Rajendran | G10L 15/22 |
| 2023/0245674 A1* | 8/2023 | Serra | G10L 25/69 |
| | | | 704/200 |

(Continued)

FOREIGN PATENT DOCUMENTS

| | | | | |
|---|---|---|---|---|
| WO | WO-2021259842 A1 * | 12/2021 | | G10L 25/30 |
| WO | WO-2022076891 A1 * | 4/2022 | | G09B 19/04 |

OTHER PUBLICATIONS

X. Min, G. Zhai, J. Zhou, M. C. Q. Farias and A. C. Bovik, "Study of Subjective and Objective Quality Assessment of Audio-Visual Signals," in IEEE Transactions on Image Processing, vol. 29, pp. 6054-6068, 2020, doi: 10.1109/TIP.2020.2988148. keywords: {Streaming media; Distortion; Databases;Quality ass (Year: 2020).*

(Continued)

*Primary Examiner* — Bharatkumar S Shah
(74) *Attorney, Agent, or Firm* — BakerHostetler

(57) ABSTRACT

An audio assessment machine learning model, for example including one or more neural networks, may be trained for human audio quality assessment estimation, wherein the training comprises performing comparisons of a plurality of training machine learning audio quality assessments of training audio content to a plurality of human audio quality assessments of the training audio content and adjusting the audio assessment machine learning model based on the comparisons. After the training, a first audio analysis of first audio content may be performed by the audio assessment machine learning model. A first machine learning audio quality assessment of the first audio content may be provided, by the audio assessment machine learning model, based on the first audio analysis. The first machine learning audio quality assessment may include a quality score for the first audio content and a quality degradation reason for the first audio content.

20 Claims, 7 Drawing Sheets

(51) Int. Cl.
*G06N 3/08* (2023.01)
*G10L 25/30* (2013.01)

(58) Field of Classification Search
USPC .......................................... 704/202
See application file for complete search history.

(56) References Cited

U.S. PATENT DOCUMENTS

2023/0320642 A1* 10/2023 Lin .................... G06F 40/30
2024/0070458 A1*  2/2024 Charnock ............ G06N 3/08

OTHER PUBLICATIONS

J. Zheng, M. Zhu and Y. Song, "On objective assessment of audio quality—A review," 2012 International Conference on Audio, Language and Image Processing, Shanghai, China, 2012, pp. 777-782, doi: 10.1109/ICALIP.2012.6376719. keywords: {Psychoacoustic models;Quality assessment;Speech;Speech processin (Year: 2012).*
X. Min, G. Zhai, J. Zhou, M. C. Q. Farias and A. C. Bovik, "Study of Subjective and Objective Quality Assessment of Audio-Visual Signals, " in IEEE Transactions on Image Processing, vol. 29, pp. 6054-6068, 2020, doi: 10.1109/TIP.2020.2988148. keywords: {Streaming media; Distortion; Databases; Quality a (Year: 2020).*
J. Zheng, M. Zhu and Y. Song, "On objective assessment of audio quality—A review, " 2012 International Conference on Audio, Language and Image Processing, Shanghai, China, 2012, pp. 777-782, doi: 10.1109/ICALIP.2012.6376719. keywords: {Psychoacoustic models: Quality assessment;Speech;Speech processi (Year: 2012).*

* cited by examiner

510 Train an audio assessment machine learning (ML) model for human audio quality assessment estimation

510A Perform comparisons of a plurality of training ML audio quality assessments of training audio content to a plurality of human audio quality assessments of the training audio content

510B Adjust the audio assessment ML model based on the comparisons

512 Perform, by the audio assessment ML model a first audio analysis of first audio content

514 Provide, by the audio assessment ML model, based on the first audio analysis, a first ML audio quality assessment of the first audio content

516 Perform, by the audio assessment ML model, a second audio analysis of second audio content (e.g., formed by modifying the first audio content via an audio enhancement ML model)

518 Provide, by the audio assessment ML model, based on the second audio analysis, a second ML audio quality assessment of the second audio content

520 Determine one or more differences between the first ML audio quality assessment and the second ML audio quality assessment

522 Adjust the audio enhancement ML model based at least in part on the one or more differences

FIG. 5

MACHINE LEARNING MODEL THAT ESTIMATES HUMAN AUDIO QUALITY ASSESSMENTS

BACKGROUND

One common technique for assessing audio quality is a mean opinion score. The mean opinion score is a subjective score that indicates a human perception of the quality of audio content. To determine a mean opinion score, audio content may be played for human assessors that listen to the audio content. Each of the human assessors may then provide a subjective opinion score, which indicates a given human assessor's subjective opinion of the quality of the audio. These individual opinion scores may then be averaged, or similarly processed, to calculate the mean opinion score. While mean opinion scores may provide an effective technique for measuring human perception of audio quality, human assessors may not always be readily available to provide subjective opinions of audio quality. Moreover, the use of human assessors may impose additional costs and time delays, which may be unacceptable, such as when attempting to obtain a prompt and cost-effective assessment of audio quality.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 5 is a flowchart illustrating an example machine learning audio quality assessment and enhancement process that may be used in accordance with the present disclosure.

DETAILED DESCRIPTION

Figure 1:
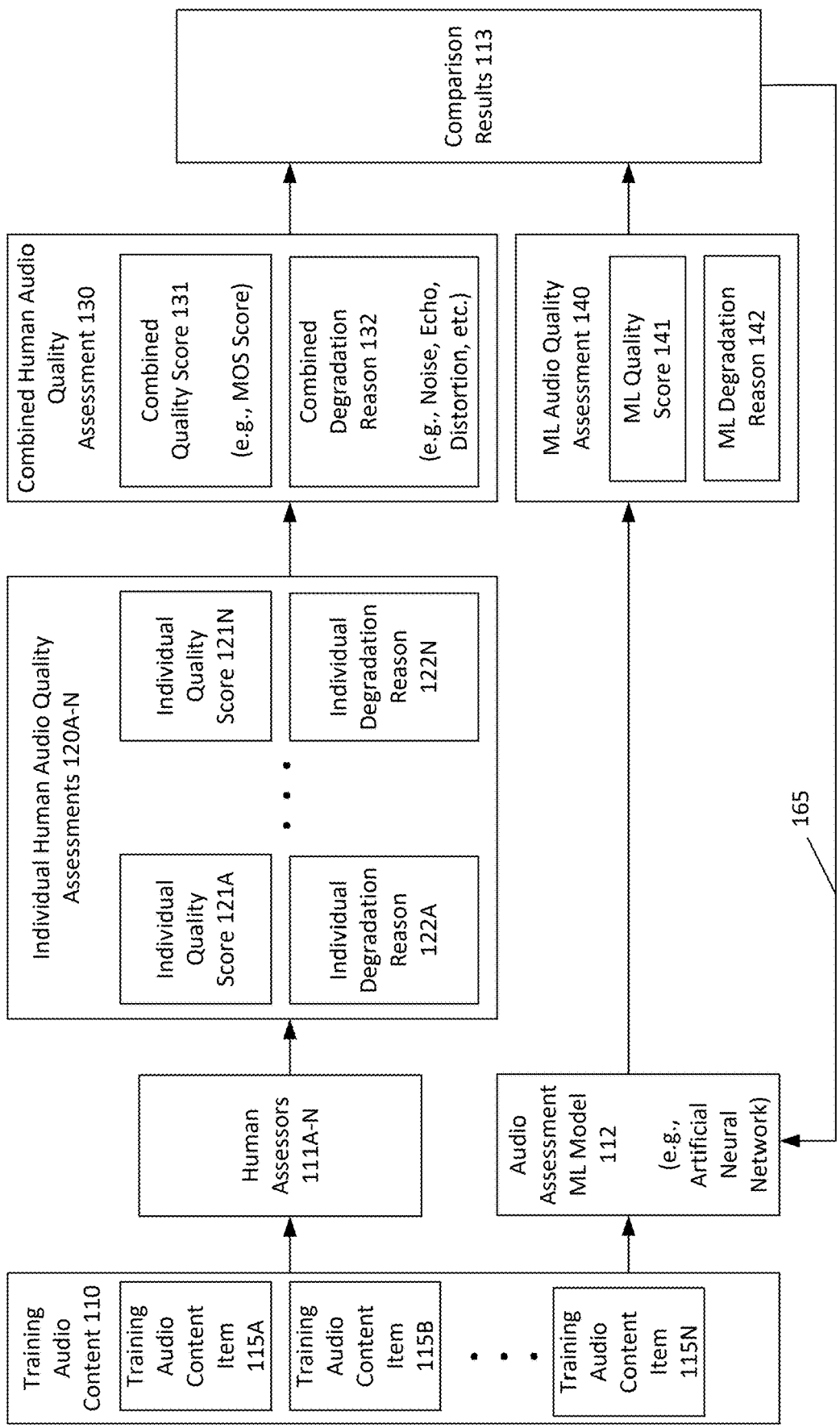
FIG. 1 is a diagram illustrating example training of an audio assessment machine learning model that may be used in accordance with the present disclosure.

Techniques for employing a machine learning (ML) model, such as one or more neural networks, to estimate human audio quality assessments are described herein. During a training phase, an audio assessment ML model, such as a neural network model, may be trained to estimate human audio quality assessments, such as subjective audio quality scores (e.g., mean opinion scores) and audio degradation reasons. In some examples, the training phase may be based on training audio content including a plurality of training audio content items. A training audio content item may be played for a group of human audio assessors. The human audio assessors may listen to the training audio content item and provide human audio quality assessments of the training audio content item. In some examples, each of the human audio assessments may include a quality score, which indicates a given human assessor's subjective opinion of the quality of the audio. Each of the human audio assessments may additionally, or alternatively, include an audio degradation reason, which indicates a given human assessor's subjective opinion of a reason why the training audio content item is degraded, for example in comparison to its original live state. For example, in some cases, the training audio content item may include audio content that has been modified from its original live state, such as by passing the audio content through an audio enhancement model, by transmitting and receiving the audio content over a communications network, by recording the audio content and/or in other ways. The audio degradation reason may indicate a reason why the training audio content item that is played for the human assessor differs from its original live state. Some example audio degradation reasons may include noise, echo, distortion, excessive loss, and the like. Each of the individual human audio quality assessments may then be combined to generate a combined human audio quality assessment, such as by averaging the individual human audio quality assessments. The combined human audio quality assessment may include a combined human quality score (e.g., mean opinion score) and a combined degradation reason, such as the most commonly indicated degradation reason from the individual human opinion scores. In some examples, individual and/or combined human audio quality assessments may be obtained for an entire audio content item and/or for portions (e.g., buckets, frames, etc.) of the audio content item.

The training audio content item may also be provided to the audio assessment ML model. The audio assessment ML model may process the training audio content item to determine a respective ML audio quality assessment. For example, the audio assessment ML model may process the training audio content item by slicing the training audio content item into a variable quantity of portions (e.g., buckets, frames, etc.) and converting the portions into the frequency domain, such as by performing a frequency domain transform (e.g., Short-Time Fourier Transform) on the training audio content item portions. The processing of the training audio content item may also include determining and evaluating frequency domain characteristics of the training audio content item portions, such as determining and evaluating amplitudes, and changes in amplitudes, of the training audio content item at various frequencies over time. The audio assessment ML model may then generate a respective ML audio quality assessment of the training audio content item. The ML audio assessment may include a quality score, which estimates a corresponding human quality score, such as the combined human quality score (e.g., the mean opinion score) for the training audio content item. The ML audio assessment may include a degradation reason, which estimates a corresponding human degradation reason, such as the combined human degradation reason for the training audio content item.

As part of the training process, the ML audio quality assessments for an audio content item may be compared to combined human audio quality assessments for an audio content item. The result of this comparison may then be provided to the audio assessment ML model as feedback for improving the ML audio quality assessments, such as to assist in making the ML audio quality assessments more similar to human audio quality assessments. For example, a loss function for the audio assessment ML model may be based, at least in part, on a function of how closely the ML audio quality assessment matches the corresponding human audio quality assessment, for example for both the ML quality score and the ML degradation reason.

After the audio assessment ML model is trained, the audio ML assessment model may be provided as a web service, or otherwise made available, to assess the quality of other audio content, such as to determine ML quality scores and ML degradation reasons for the other audio content. In some examples, the ML degradation reason may be used to take a specific corrective action to improve the quality of audio content. For example, if the ML degradation reason indicates that the audio is degraded due to excessive noise, then this may be a trigger to activate one or more noise reducing elements in order to improve the quality of the audio content.

In some examples, the audio assessment ML model may be used to assist in training, or otherwise improving the effectiveness, of an audio enhancement ML model. For example, in some cases, a combination of both ML-assessed and human-assessed audio content may be used to train the audio enhancement ML model. This may allow the volume of training data that is used to train the audio enhancement ML model to be increased, for example in comparison to using only human assessments. This may be advantageous, as human audio assessors may not always be readily available and may involve additional costs and delays. An audio enhancement ML model is a ML model that is used to enhance the quality of audio content. An audio enhancement ML model may receive input audio content and may perform various enhancement functions on the input audio content to generate corresponding output audio content that is enhanced relative to the input audio content. The audio enhancement functions may include, for example, the removal of noise and echo, up-sampling audio to improve resolution, and predicting lost packets in a lossy stream (either due to compression or packet loss). In some examples, given input audio content may be modified by an audio enhancement model, using one or more audio enhancement functions, to create a corresponding output audio content. Also, in some examples, both the input audio content and the output audio content may be provided to the audio assessment ML model, which may provide ML audio quality assessments for both the input audio content and the output audio content.

The input ML audio quality assessments for the input audio content may then be compared to the output ML audio quality assessments for the output audio content. The result of this comparison may then be provided to the audio enhancement ML model, along with the input and output ML audio quality assessments, as feedback for improving the ML audio quality enhancement functions. In some examples, a loss function for the audio enhancement ML model may be based, at least in part, on a function of how much the output ML audio quality assessment (e.g., audio quality scores) of the output audio content has improved, or potentially even degraded, relative to the input ML audio quality assessment (e.g., audio quality scores) of the input audio content. For example, if an output ML audio quality score is substantially higher than an input ML audio quality score, then this may be an indication that the audio enhancement ML model is operating in a desired manner, and a use of the current audio enhancement functions may be propagated. By contrast, if an output ML audio quality score is not substantially higher, or even lower, than an input ML audio quality score, then this may be an indication that the audio enhancement ML model is not operating in a desired manner, and the current audio enhancement functions may be modified in order to perform a more effective audio enhancement. Moreover, an ML-estimated degradation reason, which may be included in the output ML audio quality assessment, may also provide feedback for improving the audio enhancement ML model, such as by indicating which, if any, specific audio enhancement functions (e.g., noise reduction, echo reduction, etc.) should be improved or modified.

FIG. 1 is a diagram illustrating example training of an audio assessment machine learning model that may be used in accordance with the present disclosure. During a training phase, an audio assessment ML model 112 may be trained to provide an ML audio quality assessment 140 that accurately estimates human audio quality assessments, such as combined human audio quality assessment 130. As will be described in detail below, audio assessment ML model 112 may include one or more neural networks, for example including one or more convolutional neural networks and/or one or more recurrent neural networks. In some examples, the training phase may be based on training audio content 110 including a plurality of training audio content items 115A-N. The training audio content items 115A-N may include any one or more of a variety of different types of audio content, such as speech, music, other sounds, and the like. In some examples, different audio assessment ML models may be trained to assess different types of audio content. For example, a first audio assessment ML model may be trained to assess speech, and a second audio assessment ML model may be trained to assess classical music, and a third audio assessment ML model may be trained to assess rock music. In other examples, a single audio assessment ML model may be trained for different types of audio content.

The training phase will now be described first with reference to training audio content item 115A and may then be repeated for each remaining training audio content item (training audio content items 115B-N). Training audio content item 115A may be played, for example either individually or collectively, for human assessors 111A-N. The human assessors 111A-N may listen to the training audio content item 115A and provide individual human audio quality assessments 120A-N of the training audio content item 115A-N. In some examples, each of the individual human audio quality assessments 120A-N may include an individual quality score 121A-N, respectively, which indicates a given human assessor's subjective opinion of the quality of the training audio content item 115A. Each of the individual human audio quality assessments 120A-N may additionally, or alternatively, include an individual degradation reason 122A-N, respectively, which indicates a given human assessor's subjective opinion of a reason why the training audio content item 115A is degraded, for example in comparison to its original live state. For example, in some cases, the training audio content item 115A may include audio content that has been modified from its original live state, such as by passing the audio content through an audio enhancement model, by transmitting and receiving the audio content item over a communications network, by recording the audio content and/or in other ways. The individual degradation reasons 122A-N may indicate reasons why the training audio content item 115A that is played for the human assessors 111A-N differs from its original live state.

Some examples of individual degradation reasons 122A-N may include noise, echo, distortion, excessive loss, and the like.

Various techniques may be employed for obtaining the individual degradation reasons 122A-N. In some examples, the human assessors 111A-N may be provided with a list of selectable degradation reasons from which to select the individual degradation reasons 122A-N. Also, in some examples, a word-based clustering of the individual degradation reasons 122A-N may be performed, such as to cluster similar degradation reasons that may be worded or described slightly differently by different human assessors 111A-N. In yet other examples, the training audio content item 115A may be assessed ahead of time, such as by a designated human assessor, to determine a designated degradation reason, and it may then be assumed that the designated degradation reason should be applied to each individual human assessor that assigns an individual quality score 121A-N below a given threshold.

Each of the individual human audio quality assessments 120A-N may then be combined to generate a combined human audio quality assessment 130, such as by averaging the individual human audio quality assessments. The combined human audio quality assessment 130 may include a combined quality score 131 (e.g., mean opinion score) and a combined degradation reason 132. In some examples, the combined quality score 131 may be an average, and/or may be otherwise based on an average, of the individual quality scores 121A-N, for example with some additional processing (e.g., removal of outlier scores, etc.). Also, the combined degradation reason 132 may be based on the individual degradation reasons 122A-N. For example, the combined degradation reason 132 may be selected as the most commonly indicated degradation reason from the individual degradation reasons 122A-N. In some examples, individual human audio quality assessments 120A-N and/or combined human audio quality assessment 130 may be obtained for the entirety of training audio content item 115A and/or for portions (e.g., buckets, frames, etc.) of the training audio content item 115A.

The training audio content item 115A may also be provided to the audio assessment ML model 112. The audio assessment ML model 112 may process the training audio content item 115A to generate an ML audio quality assessment 140. Some example techniques for audio content item processing, by the audio assessment ML model 112, to generate a ML audio quality assessment 140, are described in detail below with reference to FIG. 2. The ML audio quality assessment 140 may include an ML quality score 141, which estimates a corresponding human quality score, such as the combined quality score 131 (e.g., the mean opinion score) for the training audio content item 115A and/or a respective portion thereof. The ML audio quality assessment 140 may also include an ML degradation reason 142, which estimates a corresponding human degradation reason, such as the combined degradation reason 132 for the training audio content item 115A and/or a respective portion thereof.

As part of the training process, the ML audio quality assessment 140 for training audio content item 115A (and/or a respective portion thereof) may be compared to combined human audio quality assessment 130 for training audio content item 115A (and/or a respective portion thereof). Comparison results 113 include the results of this comparison. The comparison results 113 may include an indication of how closely the ML quality score 141 matches the combined quality score 131 and an indication of how closely the ML degradation reason 142 matches the combined degradation reason 132. As shown by feedback path 165, the comparison results 113 may then be provided to the audio assessment ML model 112 as feedback for improving subsequent ML audio quality assessments, such as to assist in making the ML audio quality assessments more similar to human audio quality assessments. For example, a loss function for the audio assessment ML model 112 may be based, at least in part, on a function of how closely the ML audio quality assessment 140 matches the combined human audio quality assessment 130. This may include both a comparison of how closely the ML quality score 141 matches the combined quality score 131 and a comparison of how closely the ML degradation reason 142 matches the combined degradation reason 132. The audio assessment ML model 112 may then be adjusted based on the comparison results 113. For example, if the ML audio quality assessment 140 is identical, or similar (e.g., within one or more configurable thresholds), to the combined human audio quality assessment 130, then current trial assessment techniques (e.g., algorithms, features, etc.) that are employed by the audio assessment ML model 112 to generate the ML audio quality assessment 140 (e.g. including ML quality score 141 and/or ML degradation reason 142) may be propagated, such by assigning them higher weights and/or higher priorities then other trial assessment techniques that may be attempted by the audio assessment ML model 112 during training. By contrast, if the ML audio quality assessment 140 is not identical and not similar (e.g., not within one or more configurable thresholds), to the combined human audio quality assessment 130, then the current trial assessment techniques (e.g., algorithms, features, etc.) that are employed by the audio assessment ML model 112 to generate the ML audio quality assessment 140 (e.g. including ML quality score 141 and/or ML degradation reason 142) may be deprecated, such by assigning them lower weights and/or lower priorities then other trial assessment techniques that may be attempted by the audio assessment ML model 112 during training.

In order to continue training of the audio assessment ML model 112, the process described above for training audio content item 115A may be repeated for each remaining training audio content item (training audio content items 115B-N) in the training audio content 110. After the audio assessment ML model 112 is trained, the audio assessment ML model 112 may be provided as a web service, or otherwise made available, to assess the quality of other audio content, such as to determine quality scores and degradation reasons for the other audio content. In some examples, the ML degradation reason 242 may be used to take a specific corrective action to improve the quality of audio content. For example, if the ML degradation reason 242 indicates that the audio is degraded due to excessive noise, then this may be a trigger to activate one or more noise reducing elements in order to improve the quality of the audio content.

Figure 2:
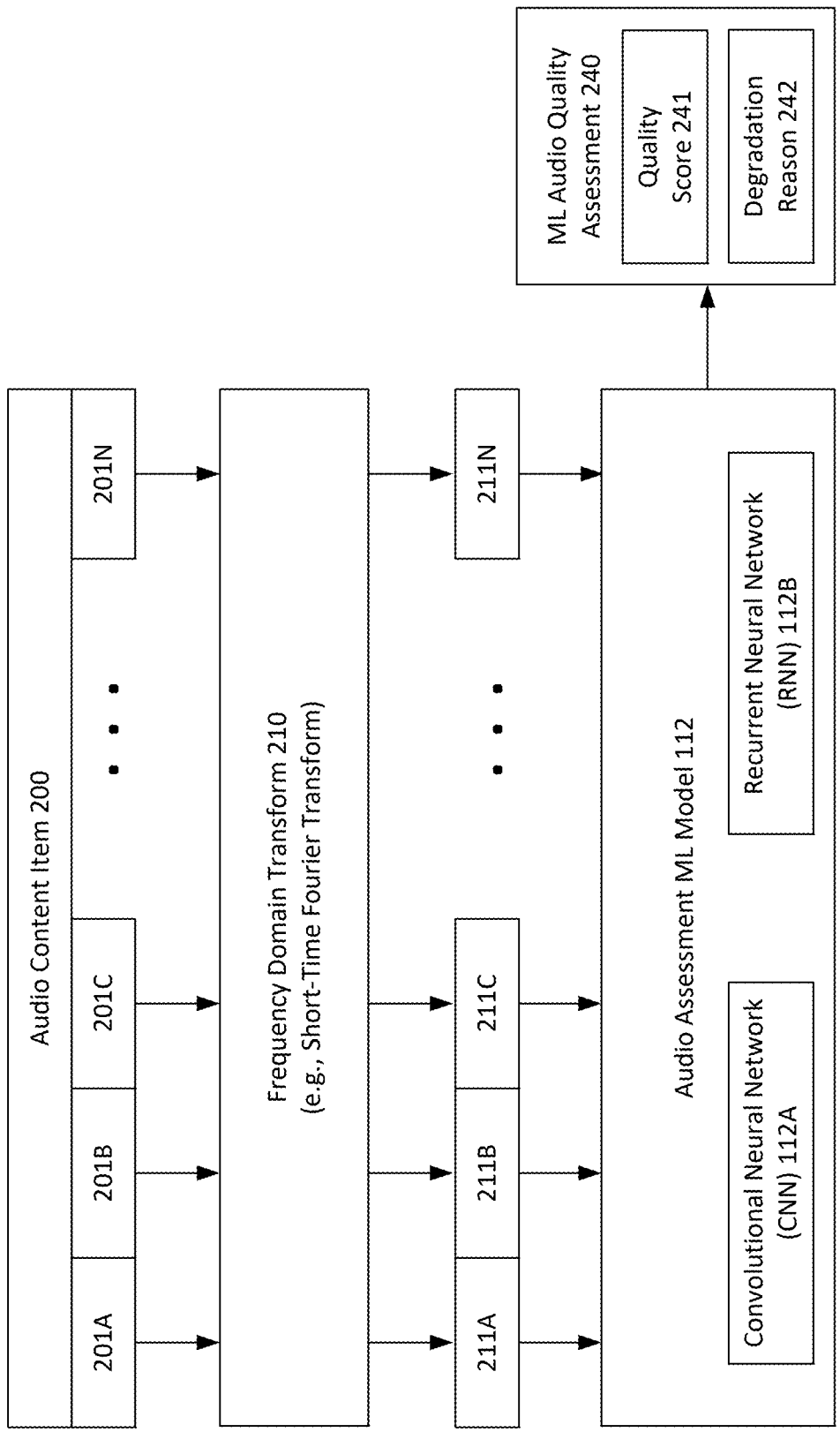
FIG. 2 is a diagram illustrating example audio content item assessment processing that may be used in accordance with the present disclosure.

Referring now to FIG. 2, example audio content item assessment processing will now be described in detail. FIG. 2 describes example audio content item assessment processing with respect to audio content item 200. The example processing of FIG. 2 may be performed as part of the training of the audio assessment ML model 112. Thus, in some examples, audio content item 200 may be one of the training audio content items 115A-N. Additionally, the example processing of FIG. 2 may be performed after training to assess the quality of other audio content. Thus, in some examples, audio content item 200 may include other (post-training) audio content, such as input audio content 301 and/or output audio content 302 described below with reference to FIGS. 3-4. As shown in FIG. 2, audio content item 200 may be sliced into any number of audio portions 201A-N (e.g., buckets, frames, etc.). The audio portions 201A-N are not required to have any particular size, and each of the audio portions 201A-N may have the same, or different, sizes. Each of the audio portions 201A-N may then be converted into frequency domain portions 211A-N, respectively, such as by performing a frequency domain transform 210 (e.g., Short-Time Fourier Transform) on the audio portions 201A-N. The audio assessment ML model 112 may then evaluate each of the frequency domain portions 211A-N to determine frequency domain characteristics of the audio portions 201A-N, such as amplitudes, and changes in amplitudes, of the audio portions 201A-N at various frequencies over time. The audio assessment ML model may then generate an ML audio quality assessment 240 based on these frequency domain features and/or other audio characteristics. For example, in some cases, in addition, or as an alternative to, frequency domain features, the ML audio quality assessment 240 may be generated based on other audio characteristics, such as time domain features. Thus, while FIG. 2 depicts an example in which audio portions 201A-N are converted to the frequency domain, there is no requirement that a frequency domain analysis must be performed. Moreover, the frequency domain characteristics may be evaluated in combination with time domain and/or other audio characteristics In some examples, ML audio quality assessment 240 may be generated separately for each of the audio portions 201A-N. Additionally, or alternatively, ML audio quality assessment 240 may be an overall assessment that is generated for the audio content item 200 in its entirety. In the example of FIG. 2, the audio assessment ML model 112 includes convolutional neural network 112A and recurrent neural network 112B, which are both neural networks. In some examples, both the convolutional neural network 112A and recurrent neural network 112B may run in parallel to assist in calculation of the ML audio quality assessment 240. For example, in some cases, convolutional neural network 112A may be employed to assist in calculating the ML audio quality assessment 240 for smaller amounts of audio, such as one of more of audio portions 201A-N. Additionally, in some cases, recurrent neural network 112B may assist in calculating the ML audio quality assessment 240 for larger amounts of audio over time, such as for all of audio content item 200 or for larger groups of audio portions 201A-N. For example, the recurrent neural network 112B may calculate an ML audio quality assessment 240 that is aggregated over audio portions 201A-N and may have an adjustable memory that is configurable to save audio characteristics and/or audio assessments for a configurable time period and/or quantity of frames or buckets.

Figure 3:
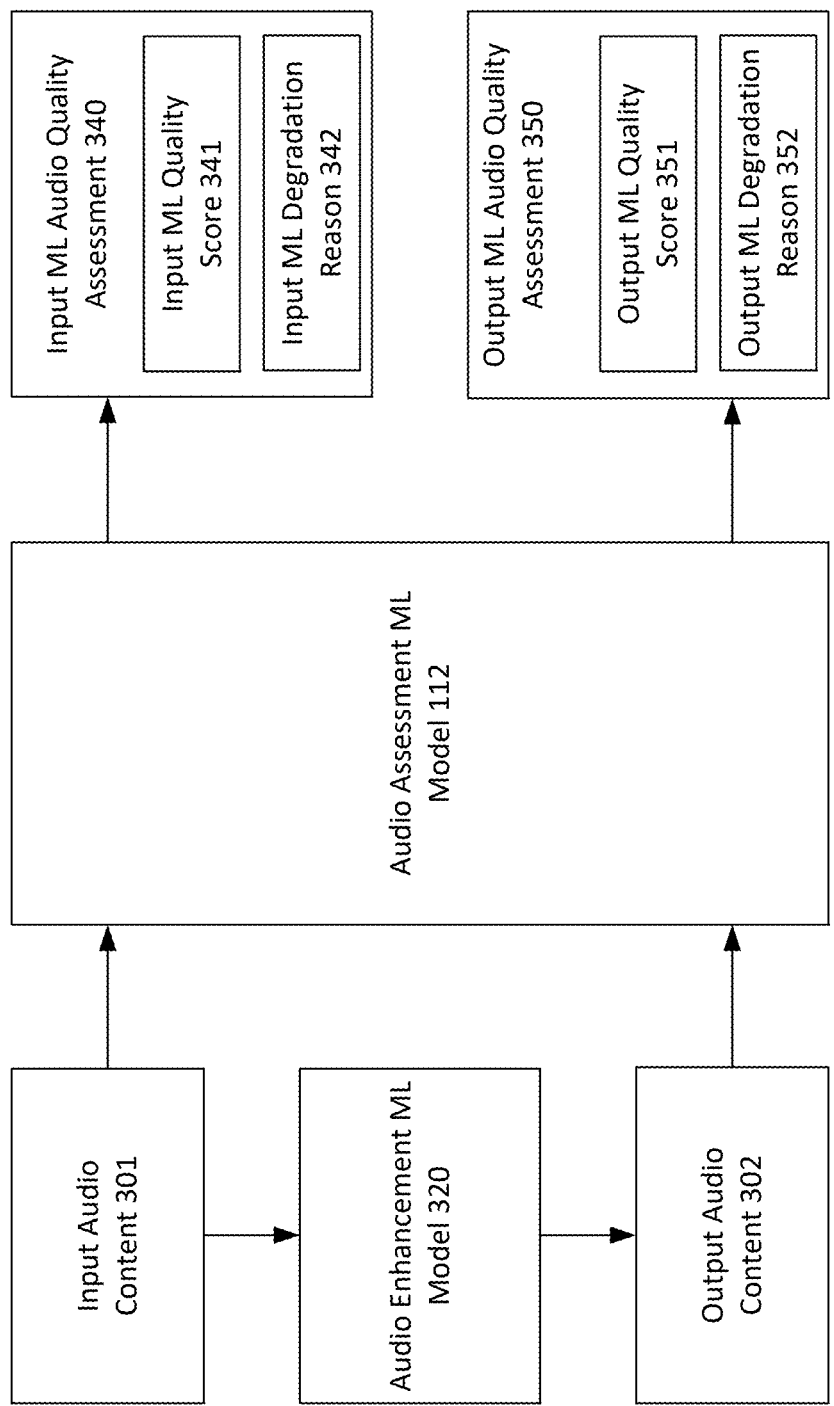
FIG. 3 is a diagram illustrating example input and output audio content item assessments that may be used in accordance with the present disclosure.

Referring now to FIG. 3, an example is described in which the audio assessment ML model 112 may be used to assist in training, or otherwise improving the effectiveness, of an audio enhancement ML model 320. Specifically, audio enhancement ML model 320 is used to enhance the quality of audio content, including input audio content 301 of FIG. 3. The audio enhancement ML model 320 may include, for example, one or more neural networks. In the example of FIG. 3, audio enhancement ML model 320 receives input audio content 301 and performs various enhancement functions on the input audio content 301 to generate output audio content 302. The audio enhancement functions may include, for example, the removal of noise and echo, up-sampling audio to improve resolution, and predicting lost packets in a lossy stream (either due to compression or packet loss). As shown in FIG. 3, both the input audio content 301 and the output audio content 302 are provided to the audio assessment ML model 112, for example to different instances of the audio assessment ML model 112. The audio assessment ML model 112 provides an input ML audio quality assessment 340 for the input audio content 301, for example including input ML quality score 341 and input ML degradation reason 342. The audio assessment ML model 112 provides an output ML audio quality assessment 350 for the output audio content 302, for example including output ML quality score 351 and output ML degradation reason 352.

Figure 4:
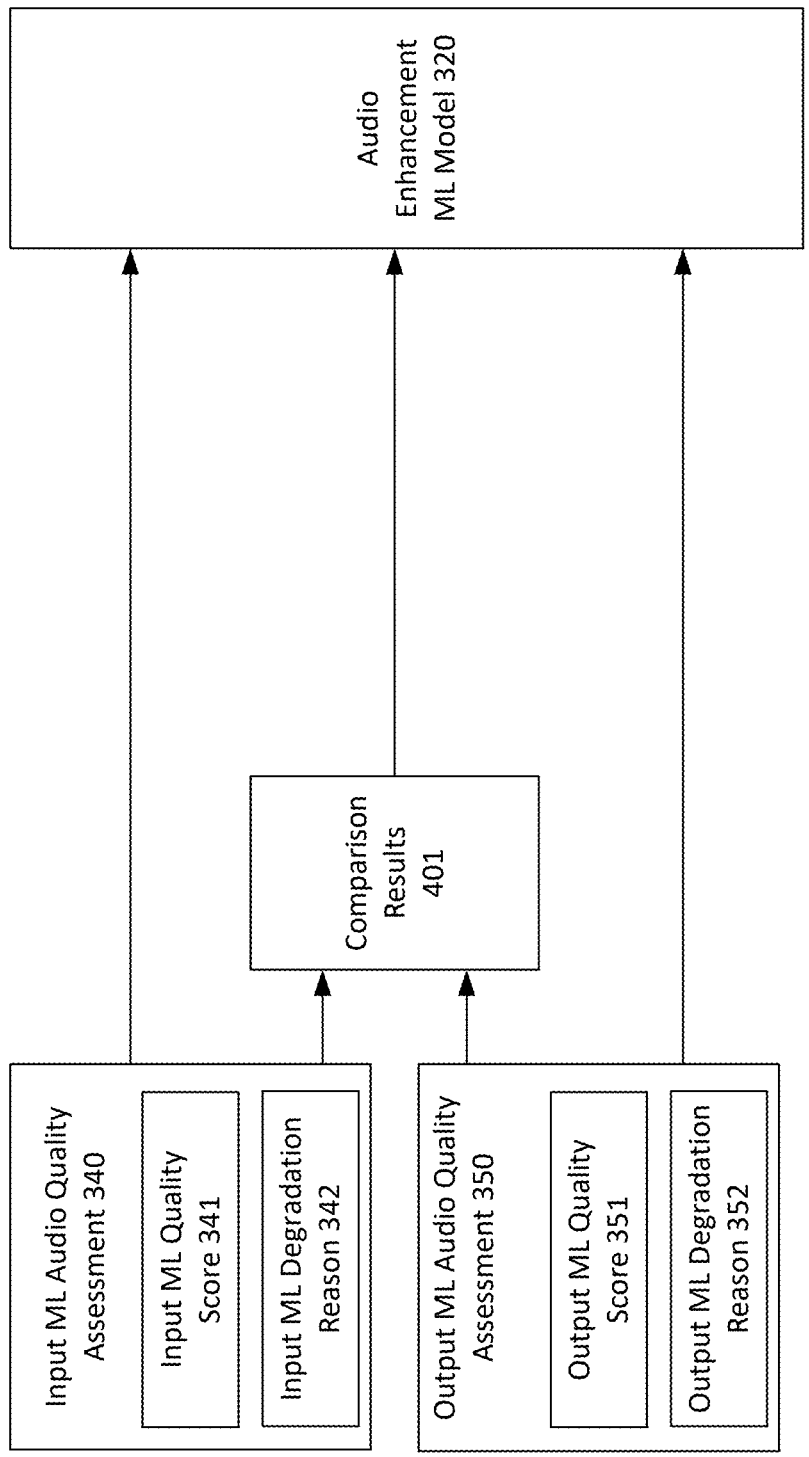
FIG. 4 is a diagram illustrating example training of an audio enhancement machine learning model that may be used in accordance with the present disclosure.

Referring now to FIG. 4, it is shown that the input ML audio quality assessment 340 for the input audio content 301 may then be compared to the output ML audio quality assessment 350 for the output audio content 302. The results of this comparison, for example including one or more differences between the input ML audio quality assessment 340 and the output ML audio quality assessment 350, are included in comparison results 401. The comparison results 401, in combination with both the input ML audio quality assessment 340 and the output ML audio quality assessment 350, may then be provided to the audio enhancement ML model 320 as feedback for improving the ML audio quality enhancement functions. The audio enhancement ML model 320 may be provided with information that correlates the input ML audio quality assessment 340 to the input audio content 301 and that correlates the output ML audio quality assessment 350 with the output audio content 302. In some examples, a loss function for the audio enhancement ML model 320 may be based, at least in part, on a function of a difference between the output ML quality score 351 and the input ML quality score 341. For example, the loss function for the audio enhancement ML model 320 may be based, at least in part, on a function of how much the output ML quality score 351 has improved, or potentially even degraded, relative to the input ML quality score 341. For example, if the output ML quality score 351 is substantially higher than an input ML quality score 341, then this may be an indication that the audio enhancement ML model 320 is operating in a desired manner, and a use of the current audio enhancement functions may be propagated. By contrast, if an output ML quality score 351 is not substantially higher, or even lower, than input ML quality score 341, then this may be an indication that the audio enhancement ML model 320 is not operating in a desired manner, and the current audio enhancement functions may be modified to in order to perform a more effective audio enhancement. Additionally, differences between the output ML degradation reason 352 and the input ML degradation reason 342 may also be used to adjust the audio enhancement ML model 320. For example, if the output ML degradation reason 352 includes a new degradation reason that is not included in the input ML degradation reason 342, then this may be an indication that the audio enhancement ML model 320 may have caused and/or worsened this degradation condition, and one or more corresponding specific audio enhancement functions (e.g., noise reduction, echo reduction, etc.) may therefore be improved or modified. By contrast, if the input ML degradation reason 342 includes a degradation reason that is not included in the output ML degradation reason 342, then this may be an indication that the audio enhancement ML model 320 may have removed this degradation condition, and this may be a confirmation that one or more corresponding specific audio enhancement functions (e.g., noise reduction, echo reduction, etc.) are operating as desired.

In some examples, in addition, or as an alternative, to being used to adjust the audio enhancement model 320, the comparison results 401 may be used to estimate the subjective performance of the audio enhancement model 320 during training. Specifically, the audio assessment ML model 112 could be used to monitor the progress of training of the audio enhancement model 320 with respect to subjective performance to find an appropriate stopping point for the training. For example, in some cases, training of the audio enhancement model 320 may be stopped when it is determined that the output ML quality score 351 is higher than the input ML quality score 341 by a desired amount and/or for a desired amount of training samples.

In some examples, a combination of both ML-assessed and human-assessed audio content may be used to train the audio enhancement ML model 320. This may allow the volume of training data that is used to train the audio enhancement ML model 320 to be increased, for example in comparison to using only human assessments. This may be advantageous, as human audio assessors may not always be readily available and may involve additional costs and delays. Apart from the ability to increase the magnitude of training data that may be applied to the audio enhancement ML model 320, the use of the audio assessment ML model 112 may be used in a number of other ways. For example, when inferring audio samples in a production environment, ML audio quality assessments may be calculated for the audio, both before and after inference. If it is determined that the audio was not improved (or perhaps even degraded), a Short-Time Fourier Transform snapshot of this audio (or other representation of the audio useful to train the audio enhancement ML model 320) before and after inference, along with the ML audio quality assessments, may be sent to an audio enhancement service, such as a cloud service, for inclusion in a library of transformed audio. This library of transformed audio, with the ML audio quality assessments, may then be used to improve the audio enhancement ML model 320. In some examples, a metric may be produced that indicates how well the audio enhancement ML model 320 is performing in a production environment. Additionally, for example, the ML audio quality assessments may be used in the context of a canary. For example, in some cases, it may be known or expected that an audio quality score for a given piece of audio should improve by a certain factor after an audio enhancement action is performed on the audio. In some examples, if this factor is not met, it may be inferred that the audio enhancement ML model 320 is underperforming or failing. In essence, a canary may be made, based on the input ML quality score 341 and the output ML quality score 351. A canary, as that term is used herein, refers to a repeatable automated testing process and/or system that allows testing of a subject process and/or system to determine whether the subject process and/or system is functioning as expected or as desired. Thus, in some examples, one or more differences may be determined between the first ML audio quality assessment and the second ML audio quality assessment. A correctness evaluation of a functioning of the audio enhancement ML model 320 may then be performed based, at least in part, on the one or more differences. The correctness evaluation may be an evaluation that indicates whether, or not, the audio enhancement ML model 320 is functioning correctly (e.g., functioning as expected or as desired).

FIG. 5 is a flowchart illustrating an example machine learning audio quality assessment and enhancement process that may be used in accordance with the present disclosure. At operation 510, an audio assessment machine learning (ML) model may be trained for human audio quality assessment estimation. The training may include performing comparisons of a plurality of training ML audio quality assessments of training audio content to a plurality of human audio quality assessments of the training audio content and adjusting the audio assessment ML model based on the comparisons. As described above, the audio assessment ML model may include one or more neural networks, for example including at least one of a convolutional neural network or a recurrent neural network. Operation 510 may include sub-operations 510A and 510B.

At sub-operation 510A, comparisons are performed of a plurality of training ML audio quality assessments of training audio content to a plurality of human audio quality assessments of the training audio content. As described above with reference to FIG. 1, as part of the training process, the ML audio quality assessment 140 for training audio content item 115A (and/or a respective portion thereof) may be compared to combined human audio quality assessment 130 for training audio content item 115A (and/or a respective portion thereof). Comparison results 113 include the results of this comparison. The comparison results 113 may include an indication of how closely the ML quality score 241 matches the combined quality score 131 and an indication of how closely the ML degradation reason 242 matches the combined degradation reason 132. Comparison results 113 may also be provided for each remaining training audio content item (e.g., training audio content items 115B-N) in the training audio content 110.

At sub-operation 510B, the audio assessment ML model is adjusted based on the comparisons. For example, as shown by feedback path 165, the comparison results 113 may be provided to the audio assessment ML model 140 as feedback for improving subsequent ML audio quality assessments, such as to assist in making the ML audio quality assessments more similar to human audio quality assessments. For example, a loss function for the audio assessment ML model 112 may be based, at least in part, on a function of how closely the ML audio quality assessment 140 matches the combined human audio quality assessment 130. This may include both a comparison of how closely the ML quality score 141 matches the combined quality score 131 and a comparison of how closely the ML degradation reason 142 matches the combined degradation reason 132. The audio assessment ML model 112 may then be adjusted based on the comparison results 113. For example, if the ML audio quality assessment 140 is identical, or similar (e.g., within one or more configurable thresholds), to the combined human audio quality assessment 130, then current trial assessment techniques (e.g., algorithms, features, etc.) that are employed by the audio assessment ML model 112 to generate the ML audio quality assessment 140 (e.g. including ML quality score 141 and/or ML degradation reason 142) may be propagated, such by assigning them higher weights and/or higher priorities then other trial assessment techniques that may be attempted by the audio assessment ML model 112 during training. By contrast, if the ML audio quality assessment 140 is not identical and not similar (e.g., not within one or more configurable thresholds), to the combined human audio quality assessment 130, then the current trial assessment techniques (e.g., algorithms, features, etc.) that are employed by the audio assessment ML model 112 to generate the ML audio quality assessment 140 (e.g. including ML quality score 141 and/or ML degradation reason 142) may be deprecated, such by assigning them lower weights and/or lower priorities then other trial assessment techniques that may be attempted by the audio assessment ML model 112 during training.

At operation 512, a first audio analysis of first audio content is performed, by the audio assessment ML model. The first audio analysis may be performed after the training of the audio assessment ML model. As described above, the audio assessment ML model may be provided as a web service, for example to be made available for audio content assessment. Some example techniques for performing an audio analysis on audio content are described above with reference to FIG. 2. For example, for operation 512, the first audio content may include, or may be included in, audio content item 200 of FIG. 2. As shown in FIG. 2, audio content item 200 may be sliced into any number of audio portions 201A-N (e.g., buckets, frames, etc.). Each of the audio portions 201A-N may then be converted into frequency domain portions 211A-N, respectively, such as by performing a frequency domain transform 210 (e.g., Short-Time Fourier Transform) on the audio portions 201A-N. The audio assessment ML model 112 may then evaluate each of the frequency domain portions 211A-N to determine frequency domain characteristics of the audio portions 201A-N, such as amplitudes, and changes in amplitudes, of the audio portions 201A-N at various frequencies over time. For operation 512, the first audio analysis may include evaluating one or more of the frequency domain portions 211A-N to determine frequency domain characteristics of one or more of the audio portions 201A-N, such as amplitudes, and changes in amplitudes, of the audio portions 201A-N at various frequencies over time.

At operation 514, a first ML audio quality assessment of the first audio content is provided, by the audio assessment ML model, based on the first audio analysis. The first ML audio quality assessment may estimate a first theoretical human audio quality assessment of the first audio content. The term theoretical means that the first theoretical human audio quality assessment may not actually be made by humans. Rather, the first ML audio quality assessment estimates what the human audio quality assessment for the first audio content would be it if were actually made by humans (though the first audio content may not actually be assessed by humans). The first ML audio quality assessment may include a first quality score for the first audio content and/or a first quality degradation reason for the first audio content. The first quality degradation reason may include at least one of noise, echo or distortion. In some examples, the first audio content may be input audio content 301 of FIG. 3, which is input to an audio enhancement ML model 320. For example, as shown in FIG. 3, the audio assessment ML model 112 provides an input ML audio quality assessment 340 for the input audio content 301, for example including input ML quality score 341 and input ML degradation reason 342. The input ML audio quality assessment 340 may be generated based on the frequency domain characteristics and/or other audio characteristics (e.g., time domain features) of the input audio content 301. For example, the input ML audio quality assessment 340 may be generated by evaluating the frequency domain characteristics and optionally other audio characteristics of the input audio content 301 based on the audio assessment algorithms developed during the training phase of the audio assessment ML model 112.

At operation 516, a second audio analysis of second audio content is performed, by the audio assessment ML model. In some examples, the first audio content may be modified by an audio enhancement ML model to form the second audio content. Thus, in some examples, the second audio content may be output audio content 302 of FIG. 3. For example, as shown in FIG. 3, input audio content 301 is modified by an audio enhancement ML model 320 to form the output audio content 302. The second audio analysis may be performed after the training of the audio assessment ML model. Some example techniques for performing an audio analysis on audio content are described above with reference to FIG. 2. For example, for operation 516, the second audio content may include, or may be included in, audio content item 200 of FIG. 2. As shown in FIG. 2, audio content item 200 may be sliced into any number of audio portions 201A-N (e.g., buckets, frames, etc.). Each of the audio portions 201A-N may then be converted into frequency domain portions 211A-N, respectively, such as by performing a frequency domain transform 210 (e.g., Short-Time Fourier Transform) on the audio portions 201A-N. The audio assessment ML model 112 may then evaluate each of the frequency domain portions 211A-N to determine frequency domain characteristics of the audio portions 201A-N, such as amplitudes, and changes in amplitudes, of the audio portions 201A-N at various frequencies over time. For operation 516, the second audio analysis may include evaluating one or more of the frequency domain portions 211A-N to determine frequency domain characteristics of one or more of the audio portions 201A-N, such as amplitudes, and changes in amplitudes, of the audio portions 201A-N at various frequencies over time.

At operation 518, a second ML audio quality assessment of the second audio content is provided, by the audio assessment ML model, based on the second audio analysis. The second ML audio quality assessment may estimate a second theoretical human audio quality assessment of the second audio content. The term theoretical means that the second theoretical human audio quality assessment may not actually be made by humans. Rather, the second ML audio quality assessment estimates what the human audio quality assessment for the second audio content would be it if were actually made by humans (though the second audio content may not actually be assessed by humans). The second ML audio quality assessment may include a second quality score for the second audio content and/or a second quality degradation reason for the second audio content. The second quality degradation reason may include at least one of noise, echo or distortion. For example, as shown in FIG. 3, the audio assessment ML model 112 provides an output ML audio quality assessment 350 for the output audio content 302, for example including output ML quality score 351 and output ML degradation reason 352. The output ML audio quality assessment 350 may be generated based on the frequency domain characteristics and/or other audio characteristics (e.g., time domain features) of the output audio content 302. For example, the output ML audio quality assessment 350 may be generated by evaluating the frequency domain characteristics and optionally other audio characteristics of the output audio content 302 based on the audio assessment algorithms developed during the training phase of the audio assessment ML model 112.

At operation 520, one or more differences are determined between the first ML audio quality assessment and the second ML audio quality assessment. The one or more differences determined between the first ML audio quality assessment and the second ML audio quality assessment may include one or more differences between the first ML quality score and the second ML quality score. The one or more differences determined between the first ML audio quality assessment and the second ML audio quality assessment may also include one or more differences between the first ML degradation reason and the second ML degradation reason. As described above with reference to FIG. 4, the input ML audio quality assessment 340 for the input audio content 301 may be compared to the output ML audio quality assessment 350 for the output audio content 302. The results of this comparison, for example including the one or more differences determined at operation 520, are included in comparison results 401.

At operation 522, the audio enhancement ML model is adjusted based at least in part on the one or more differences. As described above with reference to FIG. 4, the comparison results 401, in combination with both the input ML audio quality assessment 340 and the output ML audio quality assessment 350, may be provided to the audio enhancement ML model 320 as feedback for improving the ML audio quality enhancement functions. The audio enhancement ML model 320 may be provided with information that correlates the input ML audio quality assessment 340 to the input audio content 301 and that correlates the output ML audio quality assessment 350 with the output audio content 302. In some examples, a loss function for the audio enhancement ML model 320 may be based, at least in part, on a function of a difference between the output ML quality score 351 and the input ML quality score 341. For example, the loss function for the audio enhancement ML model 320 may be based, at least in part, on a function of how much the output ML quality score 351 has improved, or potentially even degraded, relative to the input ML quality score 341. For example, if the output ML quality score 351 is substantially higher than an input ML quality score 341, then this may be an indication that the audio enhancement ML model 320 is operating in a desired manner, and a use of the current audio enhancement functions may be propagated. By contrast, if an output ML quality score 351 is not substantially higher, or even lower, than input ML quality score 341, then this may be an indication that the audio enhancement ML model 320 is not operating in a desired manner, and the current audio enhancement functions may be modified to in order to perform a more effective audio enhancement. Additionally, differences between the output ML degradation reason 352 and the input ML degradation reason 342 may also be used to adjust the audio enhancement ML model 320. For example, if the output ML degradation reason 352 includes a new degradation reason that is not included in the input ML degradation reason 342, then this may be an indication that the audio enhancement ML model 320 may have caused and/or worsened this degradation condition, and one or more corresponding specific audio enhancement functions (e.g., noise reduction, echo reduction, etc.) may therefore be improved or modified. By contrast, if the input ML degradation reason 342 includes a degradation reason that is not included in the output ML degradation reason 342, then this may be an indication that the audio enhancement ML model 320 may have removed this degradation condition, and this may be a confirmation that one or more corresponding specific audio enhancement functions (e.g., noise reduction, echo reduction, etc.) are operating as desired.

As described above, in some examples, the audio assessment ML model 112 may be used to train and/or improve an audio enhancement ML model 320. In these examples, the first audio content may be input audio content 301 of FIG. 3, which is input to the audio enhancement ML model 320. Also, in these examples, the second audio content may be output audio content 302 of FIG. 3, which is output from an audio enhancement ML model 320. However, in some other examples, the audio assessment ML model 112 may be used for other purposes. For example, in some cases, the audio assessment ML model 112 may be used to assess the first audio data, such as to help improve the audio quality of the first audio data. In some examples, audio processing of the first audio content may be adjusted based, at least in part, on the first ML audio quality assessment. For example, the audio assessment ML model 112 may be used to determine a first quality degradation reason that indicates why the first audio content may be degraded, and audio processing of the first audio content may be adjusted based, at least in part, on the first quality degradation reason. In one specific example, if the first degradation reason indicates that the first audio content is degraded due to excessive noise, then this may be a trigger to activate one or more noise reducing elements in order to improve the quality of the first audio content. Also, in some examples, the audio assessment ML model 112 may be used to determine a first quality score for the first audio content, and audio processing of the first audio content may be adjusted based, at least in part, on the first quality score. For example, if the first quality score is lower than desired, then this may be a trigger to take corrective action, such as activating one or more noise and/or echo reducing elements in order to improve the quality of the first audio content. Thus, in some examples, the first audio content may be assessed without necessarily assessing second audio content. Accordingly, in some examples, operations 510-514 may be performed without necessarily performing operations 516-522. For this reason, operations 516-522 are shown with dashed lines in FIG. 5. Similarly, it is noted that, while the first audio content may sometimes be input audio content 301 of FIG. 3, the first audio content may also be other audio content that is not necessarily input to audio enhancement ML model 320. For example, in some cases, the first audio content may be output audio content 302 of FIG. 3, which is output from audio enhancement ML model 320. In yet other examples, the first audio content may be other audio content that is not input to, or output from, audio enhancement ML model 320.

Figure 6:
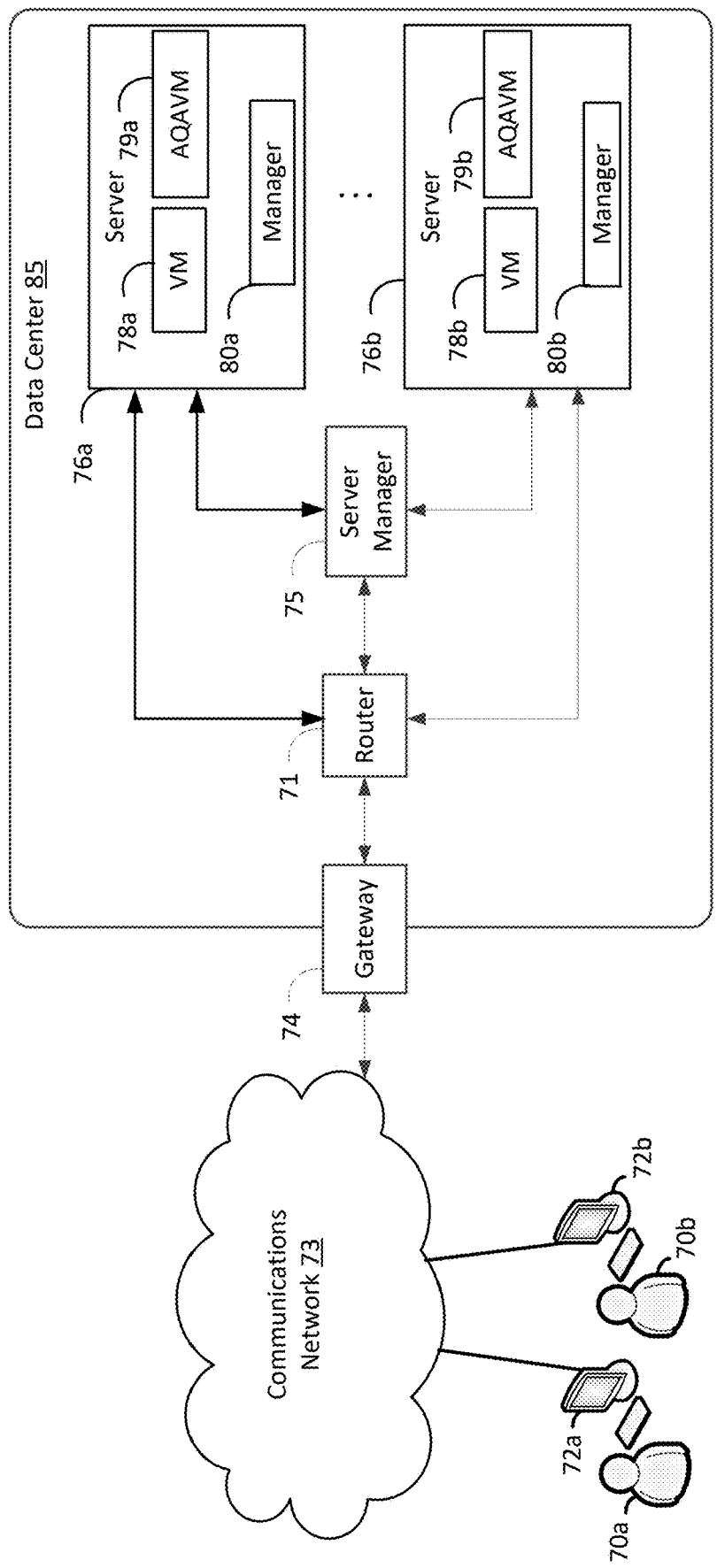
FIG. 6 is a diagram illustrating an example system for transmitting and providing data that may be used in accordance with the present disclosure.

An example system for transmitting and providing data will now be described in detail. In particular, FIG. 6 illustrates an example computing environment in which the embodiments described herein may be implemented. FIG. 6 is a diagram schematically illustrating an example of a data center 85 that can provide computing resources to users 70*a* and 70*b* (which may be referred herein singularly as user 70 or in the plural as users 70) via user computers 72*a* and 72*b* (which may be referred herein singularly as computer 72 or in the plural as computers 72) via a communications network 73. Data center 85 may be configured to provide computing resources for executing applications on a permanent or an as-needed basis. The computing resources provided by data center 85 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These services may be configurable with set or custom applications and may be configurable in size, execution, cost, latency, type, duration, accessibility and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 85 may include servers 76a and 76b (which may be referred herein singularly as server 76 or in the plural as servers 76) that provide computing resources. These resources may be available as bare metal resources or as virtual machine instances 78a-b (which may be referred herein singularly as virtual machine instance 78 or in the plural as virtual machine instances 78). In this example, the resources also include audio quality assessment (AQAVM's) 79a-b, which are virtual machines that are configured to execute any, or all, of the audio quality assessment techniques described above.

The availability of virtualization technologies for computing hardware has afforded benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, communications network 73 may, for example, be a publicly accessible network of linked networks and possibly operated by various distinct parties, such as the Internet. In other embodiments, communications network 73 may be a private network, such as a corporate or university network that is wholly or partially inaccessible to non-privileged users. In still other embodiments, communications network 73 may include one or more private networks with access to and/or from the Internet.

Communication network 73 may provide access to computers 72. User computers 72 may be computers utilized by users 70 or other customers of data center 85. For instance, user computer 72a or 72b may be a server, a desktop or laptop personal computer, a tablet computer, a wireless telephone, a personal digital assistant (PDA), an e-book reader, a game console, a set-top box or any other computing device capable of accessing data center 85. User computer 72a or 72b may connect directly to the Internet (e.g., via a cable modem or a Digital Subscriber Line (DSL)). Although only two user computers 72a and 72b are depicted, it should be appreciated that there may be multiple user computers.

User computers 72 may also be utilized to configure aspects of the computing resources provided by data center 85. In this regard, data center 85 might provide a gateway or web interface through which aspects of its operation may be configured through the use of a web browser application program executing on user computer 72. Alternately, a stand-alone application program executing on user computer 72 might access an application programming interface (API) exposed by data center 85 for performing the configuration operations. Other mechanisms for configuring the operation of various web services available at data center 85 might also be utilized.

Servers 76 shown in FIG. 6 may be servers configured appropriately for providing the computing resources described above and may provide computing resources for executing one or more web services and/or applications. In one embodiment, the computing resources may be virtual machine instances 78. In the example of virtual machine instances, each of the servers 76 may be configured to execute an instance manager 80a or 80b (which may be referred herein singularly as instance manager 80 or in the plural as instance managers 80) capable of executing the virtual machine instances 78. The instance managers 80 may be a virtual machine monitor (VMM) or another type of program configured to enable the execution of virtual machine instances 78 on server 76, for example. As discussed above, each of the virtual machine instances 78 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 85 shown in FIG. 6, a router 71 may be utilized to interconnect the servers 76a and 76b. Router 71 may also be connected to gateway 74, which is connected to communications network 73. Router 71 may be connected to one or more load balancers, and alone or in combination may manage communications within networks in data center 85, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 85 shown in FIG. 6, a server manager 75 is also employed to at least in part direct various communications to, from and/or between servers 76a and 76b. While FIG. 6 depicts router 71 positioned between gateway 74 and server manager 75, this is merely an exemplary configuration. In some cases, for example, server manager 75 may be positioned between gateway 74 and router 71. Server manager 75 may, in some cases, examine portions of incoming communications from user computers 72 to determine one or more appropriate servers 76 to receive and/or process the incoming communications. Server manager 75 may determine appropriate servers to receive and/or process the incoming communications based on factors such as an identity, location or other attributes associated with user computers 72, a nature of a task with which the communications are associated, a priority of a task with which the communications are associated, a duration of a task with which the communications are associated, a size and/or estimated resource usage of a task with which the communications are associated and many other factors. Server manager 75 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 85 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

Figure 7:
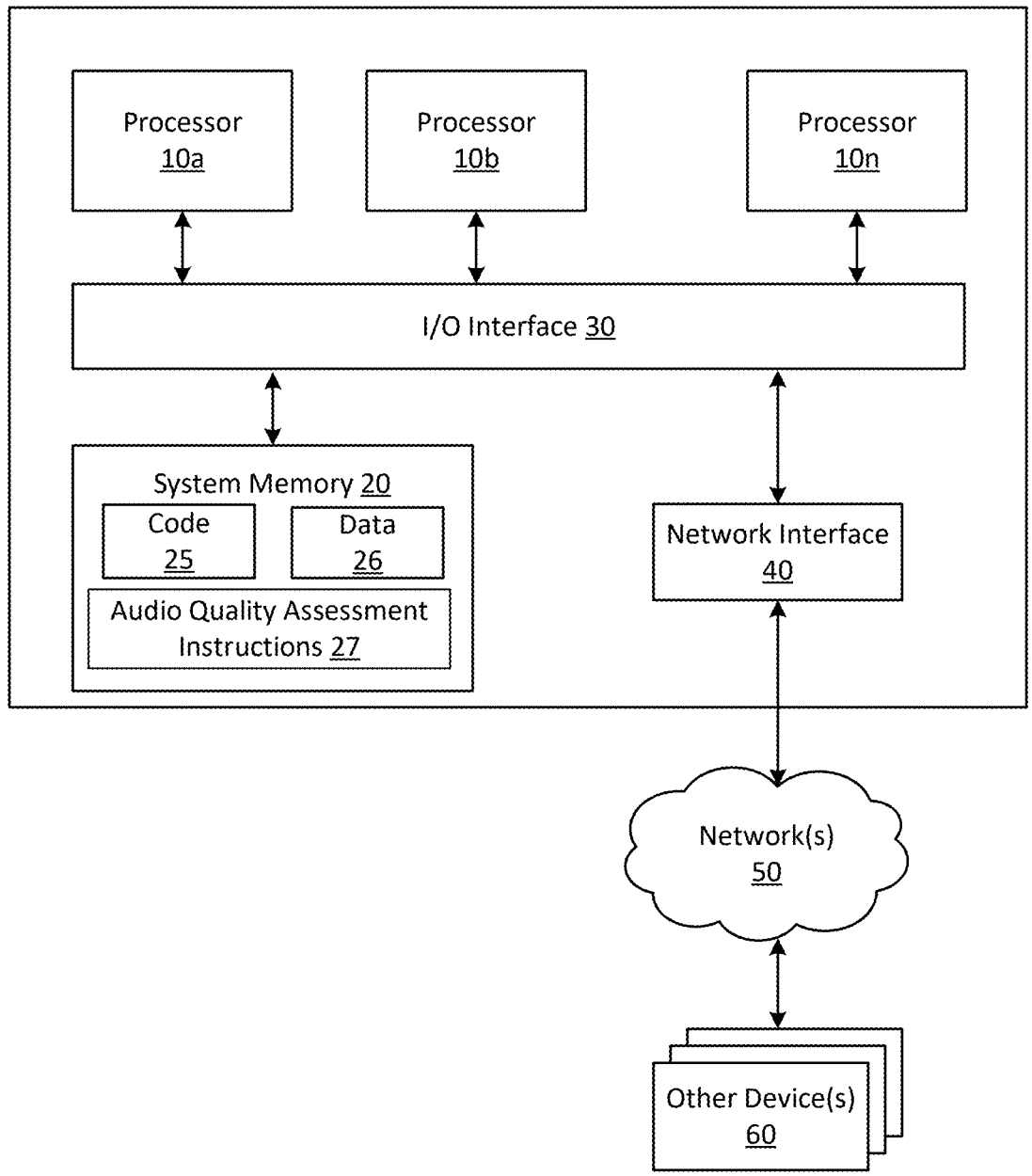
FIG. 7 is a diagram illustrating an example computing system that may be used in accordance with the present disclosure.

In at least some embodiments, a server that implements a portion or all of one or more of the technologies described herein may include a computer system that includes or is configured to access one or more computer-accessible media. FIG. 7 depicts a computer system that includes or is configured to access one or more computer-accessible media. In the illustrated embodiment, computing device 15 includes one or more processors 10a, 10b and/or 10n (which may be referred herein singularly as "a processor 10" or in the plural as "the processors 10") coupled to a system memory 20 via an input/output (I/O) interface 30. Computing device 15 further includes a network interface 40 coupled to I/O interface 30.

In various embodiments, computing device 15 may be a uniprocessor system including one processor 10 or a multiprocessor system including several processors 10 (e.g., two, four, eight or another suitable number). Processors 10 may be any suitable processors capable of executing instructions. For example, in various embodiments, processors 10 may be embedded processors implementing any of a variety of instruction set architectures (ISAs), such as the x86, PowerPC, SPARC or MIPS ISAs or any other suitable ISA. In multiprocessor systems, each of processors 10 may commonly, but not necessarily, implement the same ISA.

System memory 20 may be configured to store instructions and data accessible by processor(s) 10. In various embodiments, system memory 20 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 20 as code 25 and data 26. Additionally, in this example, system memory 20 includes audio quality assessment instructions 27, which are instructions for executing any, or all, audio quality assessment techniques described above.

In one embodiment, I/O interface 30 may be configured to coordinate I/O traffic between processor 10, system memory 20 and any peripherals in the device, including network interface 40 or other peripheral interfaces. In some embodiments, I/O interface 30 may perform any necessary protocol, timing or other data transformations to convert data signals from one component (e.g., system memory 20) into a format suitable for use by another component (e.g., processor 10). In some embodiments, I/O interface 30 may include support for devices attached through various types of peripheral buses, such as a variant of the Peripheral Component Interconnect (PCI) bus standard or the Universal Serial Bus (USB) standard, for example. In some embodiments, the function of I/O interface 30 may be split into two or more separate components, such as a north bridge and a south bridge, for example. Also, in some embodiments some or all of the functionality of I/O interface 30, such as an interface to system memory 20, may be incorporated directly into processor 10.

Network interface 40 may be configured to allow data to be exchanged between computing device 15 and other device or devices 60 attached to a network or networks 50, such as other computer systems or devices, for example. In various embodiments, network interface 40 may support communication via any suitable wired or wireless general data networks, such as types of Ethernet networks, for example. Additionally, network interface 40 may support communication via telecommunications/telephony networks, such as analog voice networks or digital fiber communications networks, via storage area networks such as Fibre Channel SANs (storage area networks) or via any other suitable type of network and/or protocol.

In some embodiments, system memory 20 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media—e.g., disk or DVD/CD coupled to computing device 15 via I/O interface 30. A non-transitory computer-accessible storage medium may also include any volatile or non-volatile media, such as RAM (e.g., SDRAM, DDR SDRAM, RDRAM, SRAM, etc.), ROM (read only memory) etc., that may be included in some embodiments of computing device 15 as system memory 20 or another type of memory. Further, a computer-accessible medium may include transmission media or signals such as electrical, electromagnetic or digital signals conveyed via a communication medium, such as a network and/or a wireless link, such as those that may be implemented via network interface 40.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, needed to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general-purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations, multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability container of a resource instance is intended to be independent of the availability container of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

As set forth above, content may be provided by a content provider to one or more clients. The term content, as used herein, refers to any presentable information, and the term content item, as used herein, refers to any collection of any such presentable information. A content provider may, for example, provide one or more content providing services for providing content to clients. The content providing services may reside on one or more servers. The content providing services may be scalable to meet the demands of one or more customers and may increase or decrease in capability based on the number and type of incoming client requests. Portions of content providing services may also be migrated to be placed in positions of reduced latency with requesting clients. For example, the content provider may determine an "edge" of a system or network associated with content providing services that is physically and/or logically closest to a particular client. The content provider may then, for example, "spin-up," migrate resources or otherwise employ components associated with the determined edge for interacting with the particular client. Such an edge determination process may, in some cases, provide an efficient technique for identifying and employing components that are well suited to interact with a particular client, and may, in some embodiments, reduce the latency for communications between a content provider and one or more clients.

In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g." and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having" and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computing system comprising:
   one or more processors; and
   one or more memories having stored therein instructions that, upon execution by the one or more processors, cause the computing system to perform operations comprising:
      performing, by an audio assessment machine learning (ML) model a first audio analysis of first audio content;
      providing, by the audio assessment ML model, based on the first audio analysis, a first ML audio quality assessment of the first audio content, wherein the first ML audio quality assessment comprises a first quality score for the first audio content and a first quality degradation reason for the first audio content;
      performing, by the audio assessment ML model, a second audio analysis of second audio content, wherein the first audio content is modified by an audio enhancement ML model to form second audio content; and
      providing, by the audio assessment ML model, based on the second audio analysis, a second ML audio quality assessment of the second audio content.

2. The computing system of claim 1, wherein the second ML audio quality assessment comprises a second quality score for the second audio content and a second quality degradation reason for the second audio content.

3. The computing system of claim 1, wherein the operations further comprise:
   determining one or more differences between the first ML audio quality assessment and the second ML audio quality assessment; and
   adjusting the audio enhancement ML model based at least in part on the one or more differences.

4. The computing system of claim 1, wherein the operations further comprise:
   training the audio assessment ML model for human audio quality assessment estimation, wherein the training comprises performing comparisons of a plurality of training ML audio quality assessments of training audio content to a plurality of human audio quality assessments of the training audio content and adjusting the audio assessment ML model based on the comparisons.

5. A computer-implemented method comprising:
   performing, by an audio assessment machine learning (ML) model a first audio analysis of first audio content;
   providing, by the audio assessment ML model, based on the first audio analysis, a first ML audio quality assessment of the first audio content, wherein the first ML audio quality assessment comprises at least one of a first quality score for the first audio content or a first quality degradation reason for the first audio content;
   performing, by the audio assessment ML model, a second audio analysis of second audio content, wherein the first audio content is modified by an audio enhancement ML model to form second audio content; and
   providing, by the audio assessment ML model, based on the second audio analysis, a second ML audio quality assessment of the second audio content.

6. The computer-implemented method of claim 5, wherein the first quality degradation reason comprises at least one of noise, echo or distortion.

7. The computer-implemented method of claim 5, wherein the audio assessment ML model comprises at least one of a convolutional neural network or a recurrent neural network.

8. The computer-implemented method of claim 5, wherein the second ML audio quality assessment comprises at least one of a second quality score for the second audio content or a second quality degradation reason for the second audio content.

9. The computer-implemented method of claim 5, further comprising:
   determining one or more differences between the first ML audio quality assessment and the second ML audio quality assessment; and
   adjusting the audio enhancement ML model based at least in part on the one or more differences.

10. The computer-implemented method of claim 9, further comprising:
    adjusting audio processing of the first audio content based, at least in part, on the first quality degradation reason for the first audio content.

11. The computer-implemented method of claim 5, further comprising:
    determining one or more differences between the first ML audio quality assessment and the second ML audio quality assessment; and
    performing, based at least in part on the one or more differences, a correctness evaluation of a functioning of the audio enhancement ML model.

12. The computer-implemented method of claim 5, wherein the audio assessment ML model is provided as a web service.

13. The computer-implemented method of claim 5, further comprising:
    training the audio assessment ML model for human audio quality assessment estimation, wherein the training comprises performing comparisons of a plurality of training ML audio quality assessments of training audio content to a plurality of human audio quality assessments of the training audio content and adjusting the audio assessment ML model based on the comparisons.

14. One or more non-transitory computer-readable storage media having stored thereon computing instructions that, upon execution by one or more computing devices, cause the one or more computing devices to perform operations comprising:
    performing, by an audio assessment machine learning (ML) model a first audio analysis of first audio content;
    providing, by the audio assessment ML model, based on the first audio analysis, a first ML audio quality assessment of the first audio content, wherein the first ML audio quality assessment comprises at least one of a first quality score for the first audio content or a first quality degradation reason for the first audio content;
    performing, by the audio assessment ML model, a second audio analysis of second audio content, wherein the first audio content is modified by an audio enhancement ML model to form second audio content; and
    providing, by the audio assessment ML model, based on the second audio analysis, a second ML audio quality assessment of the second audio content.

15. The one or more non-transitory computer-readable storage media of claim 14, wherein the second ML audio quality assessment comprises at least one of a second quality score for the second audio content or a second quality degradation reason for the second audio content.

16. The one or more non-transitory computer-readable storage media of claim 14, wherein the operations further comprise:
    determining one or more differences between the first ML audio quality assessment and the second ML audio quality assessment; and
    adjusting the audio enhancement ML model based at least in part on the one or more differences.

17. The one or more non-transitory computer-readable storage media of claim 14, wherein the audio assessment ML model is provided as a web service.

18. The one or more non-transitory computer-readable storage media of claim 14, wherein the audio assessment ML model comprises at least one of a convolutional neural network or a recurrent neural network.

19. The one or more non-transitory computer-readable storage media of claim 18, wherein the operations further comprise:
    adjusting audio processing of the first audio content based, at least in part, on the first quality degradation reason for the first audio content.

20. The one or more non-transitory computer-readable storage media of claim 14, wherein the operations further comprise:
    training the audio assessment ML model for human audio quality assessment estimation, wherein the training comprises performing comparisons of a plurality of training ML audio quality assessments of training audio content to a plurality of human audio quality assessments of the training audio content and adjusting the audio assessment ML model based on the comparisons.

* * * * *